United States Patent [19]
Piper et al.

[11] Patent Number: 4,564,450
[45] Date of Patent: Jan. 14, 1986

[54] RIGID FILTER ELEMENTS, RELATED APPARATUS AND METHODS

[75] Inventors: Louis H. Piper, Richmond, Va.; J. David White, Stone Mountain, Ga.; Ronald H. Hartman, Richmond, Va.

[73] Assignee: Dehydro Corporation, Charlotte, N.C.

[21] Appl. No.: 671,428

[22] Filed: Nov. 14, 1984

[51] Int. Cl.⁴ ............................................. B01D 39/20
[52] U.S. Cl. .................................. 210/293; 210/496; 210/506; 210/510.1
[58] Field of Search ............... 210/293, 332, 413, 482, 210/496, 506, 510.1, 791, 803

[56] References Cited

U.S. PATENT DOCUMENTS

| | | | |
|---|---|---|---|
| 1,277,832 | 9/1918 | Beckley | 210/293 X |
| 2,046,298 | 6/1936 | Woods | 210/293 |
| 2,716,490 | 8/1955 | Barstow | 210/293 X |
| 2,900,083 | 8/1959 | Oliver | 210/293 |
| 3,178,026 | 4/1965 | Christy | 210/293 |
| 3,538,020 | 11/1970 | Heskett et al. | 210/496 |
| 3,762,559 | 10/1973 | Knoy et al. | 210/293 |
| 4,208,288 | 6/1980 | Stannard et al. | 210/277 |
| 4,340,478 | 7/1982 | Stannard et al. | 210/293 X |
| 4,382,863 | 5/1983 | Riise | 210/506 X |
| 4,399,042 | 8/1983 | Stannard et al. | 210/413 X |
| 4,431,549 | 2/1984 | Highstreet et al. | 210/510.1 X |

Primary Examiner—Robert Spitzer
Attorney, Agent, or Firm—Carroll F. Palmer

[57] ABSTRACT

Modules for use in forming rigid filter beds by laying a plurality of the modules upon a planar base comprise a bottom grid unit to the top of which is fixed a rigid, porous layer. The grid unit has several intersecting series of strip elements with structured portions to promote drainage of liquid through and away from the porous layer. The grid unit may also include portions to insure interlocking of the top porous layer thereto.

11 Claims, 9 Drawing Figures

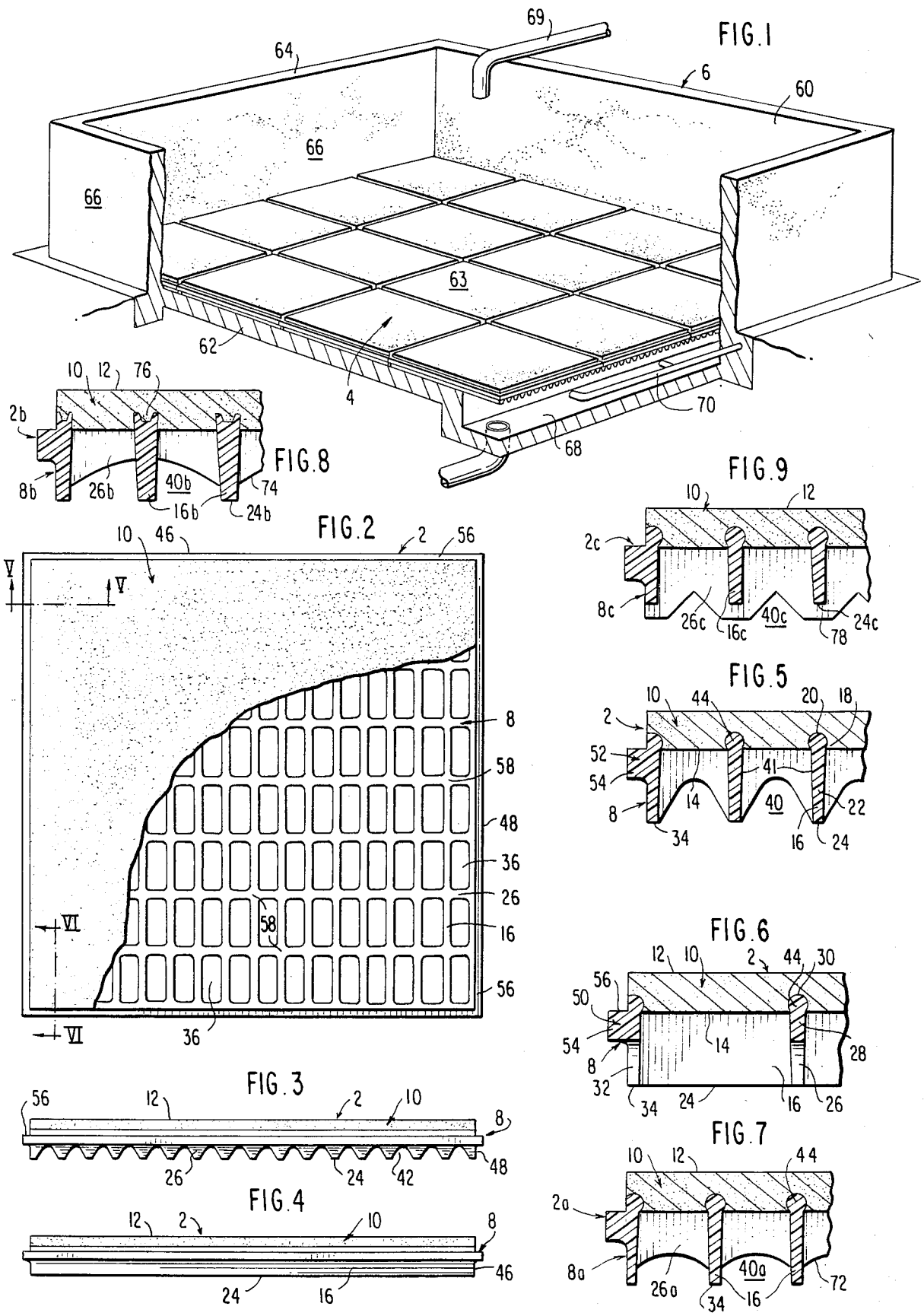

RIGID FILTER ELEMENTS, RELATED APPARATUS AND METHODS

BACKGROUND OF THE INVENTION

1. Field of the Invention

This invention relates broadly to modular filter elements, filter apparatus comprising such filter elements and to methods of making and using such elements and apparatus. More particularly, it concerns modules that may be used to form rigid filter beds by positioning a multiplicity of the modules on a support base, methods of forming the new modules and methods of forming filter beds from the modules.

2. Description of the Prior Art

There are a number of filtering operations in which a filter cake containing much fluid is formed and which presents special handling problems. For example, in the operation of wastewater treatment plants this occurs in the process of dewatering sludge as a step in disposing of it. In conventional sludge dewatering operations, the sludge influent to the dewatering step will contain typically less than 2% solids. In order to handle the sludge as a "dry product" for disposal, the sludge should contain at least about 8% solids.

Sludges generated in water treatment plants and wastewater plants can be divided into a few basic types, e.g., metal hydroxide, metal carbonate or alum sludge (chemical), waste and wastewater sludge, aerobic domestic sewage sludge (bio-mass) and anaerobic digested domestic sewage sludge (bio-mass). The present invention relates to new devices and methods capable of handling all of such classes of sludge.

Conventional filter apparatus for sludge dewatering is an open tank containing a bed of loose sand supported on a lower bed of gravel which, in turn, is supported upon the floor of the tank, usually made of concrete. This type equipment is referred to in the trade as a sand bed.

As water drains from the influent in such equipment, a mushy filter cake builds up on the top of the sand layer until the cake contains about 6% solids. At such point, cracks start to occur in the cake and these grow as more water is removed. Depending upon the amount of time the sludge charge is allowed to remain in the equipment, it can be dewatered up to about 12-15% solids. At about 6-8% solids content, the sludge is removed from the sand bed by shovels, hoes or other scraping or scooping devices. Usually a thin layer of sludge will remain on the top of the sand bed and will hinder the dewatering of the next batch of influent. Rakes or scrapers are often used to remove this sludge residue, but this can result in loss of sand eventually requiring replacement of the sand bed. Furthermore, this type sludge dewatering is undesirably slow and requires large area filters to attain needed throughput. Land acquisition costs for such units, therefore, can be high.

Another type of sludge dewatering apparatus uses a rigid bed or plate of solid particles bound in a matrix of cured resin in place of the conventional sand bed (see U.S. Pat. No. 4,208,288). The broad idea of forming filter elements by combining aggregate particles with a resin matrix to form a rigid filter media (RFM) was known in the filter art well prior to that patent (see U.S. Pat. No. 3,538,020).

Outside the field of sludge dewatering, it has also been known to form filter apparatus by creating a filter surface by placing rigid porous plates side-by-side in a tank and supported above the bottom of the tank to provide fluid removal space beneath the resulting filter bed. This type of equipment was developed as early as 1918 for use in filtering corrosive chemicals (see U.S. Pat. No. 1,277,832). Such prior knowledge was advanced by new forms of filter elements and devices disclosed in the related U.S. Pat. No. 4,431,549. This present invention provides yet further substantial improvements over the filter elements and devices disclosed in that recent patent.

While the invention is described with particular reference to water and wastewater sludge dewatering, the new elements, apparatus and methods may be effectively used for the filtration of a wide spectrum of other fluid suspensions, especially those that form filter cakes that are difficult to handle during and after their formation.

OBJECTS

A principal object of this invention is the provision of improvements in rigid filter elements and related apparatus.

Further objects include the provision of:

(1) New forms of filter elements that may be assembled to form filter beds particularly useful for the dewatering of water & wastewater sludge and similar low solids content liquid suspensions that form problem filter cakes.

(2) Filtration apparatus of simplified construction that is more effective in filtration ability and from which filter cake can be removed more efficiently than is the case with conventional sand bed filter apparatus.

(3) Filter elements of modular type that may be used to form filter beds that are strong enough to support the weight of machine driven scraping equipment for removal of filter cake from the bed.

(4) New methods for the production of rigid filter media.

(5) New forms of filter elements that combine a rigid filter plate with channels for filtrate removal.

(6) New forms of filter elements that are particularly useful for conducting vacuum filtering operations.

(7) New forms of filter elements comprising a bottom grid member interlocked with a top rigid porous layer.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The stated objects are, in part, accomplished in accordance with the invention by the provision of polyhydral modules, for use in forming a rigid filter bed by laying a plurality of the modulus upon a planar support base, that comprise a bottom grid member and a top rigid porous layer, preferably made of particulate material bound in a matrix of rigid cured binder, defined by an upper surface and a lower surface substantially parallel to the upper surface.

The grid member comprises a first series of spaced apart, parallel strip elements positioned in planes at an angle to the lower surface of the top layer. Such first series elements comprise an upper portion with a top edge and a lower portion with a bottom edge. The top edges of such first series elements lie substantially in a first single plane and their bottom edges lie substantially in a second single plane. The first and second single planes are substantially parallel to the lower surface of the rigid porous layer.

The grid member also has a second series of spaced apart, parallel strip elements positioned in planes normal or at another angle to the top layer lower surface and these intersect the first series elements at an angle. The second series elements, like the first series elements, comprise an upper portion with a top edge and a lower portion with a bottom edge. Their top edges lie substantially in aforesaid first single plane and their bottom edges advantageously lie substantially in a single plane that may be the second plane of the first series of grid elements.

The first and second series elements, together with additional series if desired, of the grid member define a multiplicity of polygonal channels depending from the top layer lower surface.

The second series elements of the grid member have lateral openings therein that extend upwardly into their lower portions from the bottom edges thereof and these lateral openings define a plurality of parallel, transverse channels in the module by which liquid draining through the top porous layer may exit from beneath a filter bed formed from a group of the modules. In a preferred embodiment, the widths of the lateral openings of the second series elements are not greater than the distance between vertical sides of adjacent first series elements. In other embodiments, lateral openings are provided in the first or other series elements, as well as the second series elements, to permit liquid drainage in a plurality of directions beneath the filter modules.

The upper portions of at least one of the first or second series elements have structured portions thereon, e.g., end enlargements, grooves, slots, etc., and these are embedded at least in part in the top porous layers of the modules. Such structured portions serve as means to anchor the top porous layer to the grid member. Other forms of mechanical interlocking means may be used, e.g., cementing, welds, or the like.

In preferred embodiments of the invention, the first series elements intersect the second series elements at a right angle and the vertical channels are quadrilateral in horizontal cross-section, e.g., the module is square in horizontal cross-section and the vertical channels are rectangular in horizontal cross-section. Also the peripheral sides of the modules are defined by strip side elements different from their first and second series elements and such side elements have lateral outward extending projections that form a peripheral ledge around the module that is parallel to the lower surface of the top layer.

Further in the preferred embodiments, the first and second series elements and the peripheral elements of the grid members are molded of rigid plastic and they are integrally joined at their points of intersection with each other so that the grid members are monolithic.

The objects of the invention are further accomplished by the provision of apparatus for the dewatering of water and wastewater sludge which comprises a tank having a substantially flat bottom, an open top, vertical sides, and exit means through which filtrate may be removed from the tank. A plurality of the modules as described above are positioned side by side within the tank with the bottom edges of the grid members of the modules resting on the flat bottom of the tank, and sealing material forms sludge-tight seals between adjacent edges of the modules to create a continuous surface filter bed.

In preferred embodiments of the invention, a sealing material is used to simplify manufacture and installation of the mats. Other methods of sealing or joining adjacent mats to form a reasonably tight connection such as overlapping or interlocking edge member, the use of seals in the form of cheverons or O-rings or other such means that will be readily apparent may be as alternatives.

The objects of the invention are still further accomplished by the provision of methods of treating water and wastewater sludge which comprises introducing sludge to be dewatered into the apparatus as described above, allowing liquid in the introduced sludge to flow through the filter bed modules and flow via spaces existing between the lower surfaces of the modules and the flat bottom of the tank into the exit means thereby creating a layer of thickened sludge on the top surfaces of the modules, and removing the thickened sludge from the apparatus by running scrapers across the top surfaces of the filter bed, by use of rakes or like hand tools, by vacuum means, or the like.

BRIEF DESCRIPTION OF THE DRAWINGS

A more complete understanding of the invention may be obtained by reference to the accompanying drawings in which:

FIG. 1 is a fragmentary, isometric view of filtering apparatus constructed in accordance with the invention.

FIG. 2 is a partially fragmented plan view of a rigid filter module of the invention.

FIG. 3 is an end view of the module of FIG. 2.

FIG. 4 is a side view of the module of FIG. 2.

FIG. 5 is a fragmentary, sectional view taken on the line V—V of FIG. 2.

FIG. 6 is a fragmentary, sectional view taken on the line VI—VI of FIG. 2.

FIGS. 7-9 are fragmentary, sectional views of other embodiments of rigid filter modules of the invention.

DESCRIPTION OF THE PREFERRED EMBODIMENTS

Referring in detail to the drawings, a polyhydral module 2 for use in forming a filter bed 4 by laying a plurality of the modules 2 in a filter apparatus 6 comprises a bottom grid member 8 and a top porous layer 10 having an upper surface 12 and a lower surface 14.

The grid member 8 comprises a first series of substantially equally spaced apart, parallel strip elements 16 positioned in planes normal to the lower surface 14. Such elements 16 each comprise an upper portion 18 with a top edge 20 and a lower portion 22 with a bottom edge 24. The top edges 20 of the elements 16 lie substantially in a first single plane and their bottom edges 24 lie substantially in a second single plane with the first and second single planes being substantially parallel to the lower surface 14.

The grid member 8 has a second series of substantially equally spaced apart, parallel strip elements 26 positioned in planes normal to the lower surface 14 and these intersect the elements 16 at an angle. The elements 26 each comprise an upper portion 28 with a top edge 30 and a lower portion 32 with a bottom edge 34. The top edges 30 lie substantially in the aforesaid first single plane and their bottom edges 34 lie substantially in the second single plane.

In the preferred embodiments of the invention shown in the drawings, the elements 16 & 26 of the grid member 8 define a multiplicity of polygonal channels 36 depending from the top layer lower surface 14. The elements 16 intersect the elements 26 at right angles, but other angles are possible.

The elements 26 of the grid member 8 have lateral openings 40 that extend upwardly into the lower portions 32 from the bottom edges 34. The maximum widths of the lateral openings 40 are less than the distance between vertical walls 41 of adjacent elements 16 and the lateral openings 40, together with the vertical walls 41 define a plurality of parallel, horizontal channels 42 in the module 8.

The upper portions 18 of the elements 16 have bulbous enlargements 44 and these are embedded, at least in part, in the top porous layer 10. Such enlargements 44 serve as means to anchor the layer 10 to the grid member 8.

The peripheral ends 46 and sides 48 of the module 8 are defined by peripheral strip elements 50 and 52 respectively. Such peripheral elements have lateral outward extending projections 54 that form a peripheral ledge 56 around the module 8 that is parallel to the lower surface 14 of the top layer 10. In preferred embodiments, the ledge 56 lies in the plane of lower surface 14, is about 5 to 20 mm. wide and has a roughened surface to assist in the bonding to sealing material used between the modules 2.

In the embodiments of the drawings, the elements 16, 26, 50 & 52 are molded of rigid plastic and are integrally joined at their points of intersections 58. However, these strip elements may be separately made and joined in other ways, e.g., sections cut from long strips and joined by cementing, mating notches, butt welding, etc. Also, the drawings show the modules 2 to be square in horizontal cross-section, but they may also be of any other desired shape. Additionally, they may include more than two series of strip elements (not shown) so that they will be other than quadrilateral, e..g., hexangonal, octangonal or any other shape that permits them to be nested on a support surface to create a flat, continuous filter bed.

A typical module of the invention will be square with sides about 60 cm. long and about 50 mm. high. The height of grid member 8 is advantageously about 2 to 10 times the thickness of top layer 10, e.g., in a typical module layer 10 will be about 15 mm. thick and grid 8 will be about 45 mm. high, channel openings 40 will be approximately semi-sine wave in shape with radius about 8 mm. and about 35 mm. on centers. Instead of semi-sine like channels, they may be other shapes, e.g., square, triangular, rectangular, pentangular, etc.

The apparatus 6 for the dewatering of water and wastewater sludge comprises a tank 60 having a substantially flat bottom 62, an open top 64, and vertical sides 66, exit means 68 through which filtrate may be removed from the tank 60 and liquid inlet means 69. A plurality of the modules 2 are positioned side by side within the tank 60 with the bottom edges 24 & 34 of the modules 2 resting on the flat bottom 62 of the tank 60 providing the filter bed 4. The bottom 62 is shown as a continuous surface. However, it can be provided with depressions to form flow collecting channels (not shown) which can serve as adjuncts to channels 40 or in other embodiments, replace the channels 40.

When the plurality of the modules 2 are assembled to form the filter bed 4, the ledges 56 are filled with sealing material (not shown) to the level of the top surface 12. This provides the bed 4 with a completely continuous, relatively smooth surface from which filter cake (not shown) may be easily removed by scrapers, shovels, or the like.

The tank 6 may include tube means 70 by which suction may be applied from below the filter bed 63 to assist filter operations performed in the apparatus 6.

The alternate form of filter module 2a shown in FIG. 7 comprises a grid member 8a formed with strip elements 16 like those of modules 2, but with modified strip elements 26a. Thus, elements 26a differ from elements 26 in that their bottom edges 72 terminate above the plane in which the bottom edges 24 of elements 16 lie and their lateral openings 40a are of different contour from the openings 40 in the elements 16.

The additional form of filter modules 2b shown in FIG. 8 comprise a grid member 8b with modified strip elements 16b and 26b. Thus, elements 26b differ from elements 26 in that their bottom edges 74 terminate above the plane in which the bottom edges 24b of elements 16b lie and their lateral openings 40b are of different contour from the openings 40 in the elements 26. Also, elements 16b differ from elements 16 in that they have a wider, tapered cross-section and, instead of the bulbous top enlargements 44, they have top edge grooves 76 to serve as the means to anchor the porous layer 10 to the grid 8b.

The further modification of filter modules 2c shown in FIG. 9 comprise a grid member 8c with modified strip elements 16c and 26c. Thus, elements 26c differ from elements 26 in that their bottom edges 78 lie in a plane below the bottom edges 24c of elements 16c and their lateral openings 40c are of different contour from the openings 40 in the elements 26. Also, elements 16c differ from elements 16 in that they are shorter in depth so that their lower edges 24c terminate above the plane in which the lower edges 78 of elements 26c lie.

It will be apparent that in the module 2c embodiment, the bottom edges 78 of the elements 26c are the load bearing portions of the grid 8c. In comparison, in the module 2 embodiments, the bottom edges 24 and 34 of both elements 16 and 26 respectively all serve as load bearing portions while in the module 8a & 8b modifications, the bottom edges 24 or 24b of the elements 16 or 16b respectively serve as the load bearing portions of the respective grids. It will also be apparent, that the width of the lateral opening 40, 40a, 40b and 40c vary and control the width of the drainage channels that they define in the underportions of the filter modules.

A wide choice of materials exists for construction of the new modules of the invention including material used to make the rigid top layers 10, the grid members 8, etc., and in the methods used for their assembly.

In preferred embodiments, the particles in the porous layers 10 are of a uniform nominal size, e.g., about 5 to 15 mesh size. Any one such nominal particle size as measured, for example, by the U.S. Standard Sieve Series (1940) screens, Tyler sieves, etc., contain a spectrum of different size particles within a limited range, but such particle groupings are considered to be of one nominal size. Particles of one nominal particle size are advantageously used in forming the modules of the invention, although use of aggregate of two or more nominal particle sizes mixed together is comprehended by the invention, e.g., an aggregate formed of 20% 8 mesh and 80% 14 mesh particles mixed together.

The particles in the layers 10 may be formed of various materials that are chemically inert to the influents to be filtered through modules 2. The preferred material for the layers 10 is tabular alumina. Typical specifications for the alumina include 8–14 mesh size (Tyler), hardness of 9 on the mohs scale, apparent density of 3.4–3.6, water adsorption of about 1.5% and a porosity of about 5%. Other useable particle materials include crushed anthracite, and, particularly, materials of a Mohs hardness of about 7.5 or greater as widely used in the coated abrasives industry, e.g., silicon carbide, emergy, garnet, corundum, boron carbide, etc.

The binder preferably used as the matrix material for binding the layer particles into a rigid filter media is epoxy resin, a generally recognized class of resin material capable of conversion to a cured condition upon suitable admixture with a catalyst (cross-linking agent). Other resins may be used, e.g., phenol-formaldehyde resins, urea-aldehyde resins, polyester resins, resorcinol-aldehyde resins and equivalent curable resins. A preferred matrix material is epoxy resin that meets the requirements of VDHT Specification Section 254.01, Type EP-4. Typical physical properties of the cured resin in preferred modules of the invention include tensile strength of 3000 psi minimum, elongation 3% maximum, compression 10,000 psi minimum and compressive modular strength 475,000 psi minimum.

The matrix component of the filter module layers may be varied and will depend to some extent on the particle material and its size. Since the matrix material is much more expensive than the aggregate the smallest amount will be used that will provide the desired strength properties to the modules. Larger aggregate requires less matrix resin than smaller aggregate. The matrix content of the modules may advantageously be between about 0.01 to 10% by weight. For layer 10 made with alumina as above described, the preferred matrix content is about 4–6% by weight. Using preferred materials as stated, the material requirements for a typical 60 cm. square module will be 5 to 8 kgms. alumina and 0.4 liter of epoxy resin.

The first step in forming the porous layers 10 of the modules 2 is to mix together the two components of the matrix resin. Then, this prepared resin material is mixed with the proper amount of particulate material until all the particles are thoroughly coated with the liquid resin. Molds made of wood or steel with bottoms to form the flat surfaces 12 that have been treated with release agent are then loaded with the resin coated particles. The loaded mass is then tamped and screeded to form a level surface, which in the completed module will be the lower surface 14. Then, a grid member 8 is inserted into the screeded surface of the matrix mix so that the enlargements 44 penetrate into the mix below the screeded surface. The thus assembled parts are then allowed to set to permit the resin in the mix to cure. The resin will fully cure in three days, but within 24 hours will attain 75% of full strength and the module may be removed from the mold.

In an alternative method, the mold has a series of projections on the bottom, each similar in size and shape to grid opening 36. Using this technique, the grid is placed in the mold prior to the addition of the resin coated alumina. After the grid is in place, the resin coated alumina is loaded and the mass is tamped and screeded to form a level surface, which if the completed module will be the upper surface 12. Depending on the exact method employed, troweling can be used in conjunction with screeding or in its place.

The grid members 8 may be formed from a wide variety of rigid materials. Advantageously, they are molded e.g., injection, compression, etc., as integral units from plastic materials having good strength characteristics and that are substantially inert relative to the liquids that will come into contact with them in use. Examples of useable plastic include plasticized polyvinyl chloride, polyolefins, e.g., polyethylene, polypropylene, etc., ABS resins, polycarbonate plastics, and similar moldable plastics. Alternatively, the grid members 8 may be cast in a mold using materials such a polyurethanes or other resins, ceramics, metals or most any other castable materials. Further, the grid members may be assembled from preformed strips of wood, corrosion resistant metal, glassfiber reinforced polyester resin, the aforesaid plastic material etc. Typical strips would be 20–50 mm. in height and 5–15 mm. in width. The enlargements 44 on them would be, for example, about circular in cross-section with a radius of about 3–10 mm., but enlargements of other shapes and sizes may be used.

The resulting modules of the invention are critically lighter in weight than those produced in accordance with the disclosure of related patent U.S. Pat. No. 4,431,549. Hence, their handling, transportation and assembly is substantially improved over these and other prior known rigid filter modules. Additional improvement features of the new modules include controlled, uniform depth; unobstructed drainage paths under the media as opposed to torturous passages formed by another layer of particles; mitigation of possible blockage of drainage passages by unwanted biological growth; reduction in manufacture time; controlled uniformity between separate modules and between liquid treatment installations comprising them.

A preferred method of treating water and wastewater sludge in accordance with the invention comprises introducing sludge to be dewatered into the apparatus 6 through inlet 69 onto the top surfaces 12 of modules 2. Liquid in the introduced sludge is allowed to flow through the modules 2 and flow via channels 40 above the flat bottom 62 of the tank 60 into the exit means 68 from which it may be pumped to waste, used for irrigation purposes, etc. The operation creates a layer of thickened sludge (not shown) on the top surfaces 10 of the modules 2 which may be removed from the apparatus 6 by running front-end mechanical scrapers (not shown) across the top surfaces 10. Alternatively, the thickened sludge may be removed by vacuum devices, shovels, hoes or any other suitable handling devices, all of which may be accomplished without damage to the filter surface, in contrast to damage frequently inflicted on sand bed filters by sludge removal. Thus, a particular feature of the new apparatus is the ability of the filter bed 20 to support the weight without damage of front-end loaders and similar heavy machine driven scrapping equipment to remove the dewatered sludge or other filter cake.

The embodiments of the invention in which an exclusive property or privilege is claimed are defined as follows:

1. A quadrilateral module for use in forming a rigid filter bed by laying a plurality of the modules side-by-side upon a flat support base comprising:

a bottom grid member molded of rigid plastic and
a top porous layer of particulate material of a single nominal size bound in a matrix of rigid cured binder defined by a flat, continuous upper surface and a lower surface substantially parallel to said upper surface, the thickness of said porous layer being appreciably less than the vertical height of said grid member,
said grid member comprising
a first series of strip elements substantially equally spaced apart, parallel and normal to said lower surface, said first series elements comprising an upper portion with a top edge and a lower portion with a bottom edge, said top edges of said first series elements lying substantially in a first single plane and said bottom edges of said first series elements lying substantially in a second single plane, said first and second single planes being substantially parallel to said lower surface,
a second series of strip elements substantially equally spaced apart, parallel and normal to said lower surface and intersecting said first series elements at a right angle, said second series elements comprising an upper portion with a top edge and a lower portion with a bottom edge, said top edges of said second series elements lying substantially in said first single plane and said bottom edges of said second series elements lying substantially in said second single plane,
said first and second series elements defining a multiplicity of quadrilateral vertical channels depending from said lower surface,
said second series elements having lateral opening therein that extend upwardly into their lower portions from said bottom edges thereof, the maximum widths of said lateral openings being not greater than the distance between adjacent second series elements, said lateral openings defining a plurality of parallel, transverse channels in said module,
said upper portions of said first and second series elements having integral bulbous enlargements at their top ends that are embedded in said top porous layer, said enlargements serving as means to anchor said top porous layer to said grid member,
the periphery of said module being defined by a third series of strip side elements different from said first and second series elements having lateral outwardly extending projections that form a peripheral ledge around said module that is parallel to said lower surface.

2. The module of claim 1 wherein said module is square and said vertical channels are rectangular in horizontal cross-section.

3. The module of claim 1 wherein the particles of said top porous layer are of size between 8 to 14 mesh and formed of tabular alumina.

4. A polyhydral module for use in forming a rigid filter bed by laying a plurality of the modules upon a planar support base comprising:
a bottom grid member and
a top rigid porous layer defined by an upper surface and a lower surface spaced apart from said upper surface,
said grid member comprising
a first series of spaced apart strip elements positioned in planes at an angle to said lower surface, said first series elements comprising an upper portion with a top edge and a lower portion with a bottom edge, said top edges of said first series elements lying substantially in a first single plane and said bottom edges of said first series elements lying substantially in a second single plane,
a second series of spaced apart strip elements positioned in planes at an angle to said lower surface and intersecting said first series elements at an angle, said second series elements comprising an upper portion with a top edge and a lower portion with a bottom edge,
said first and second series elements defining a multiplicity of polygonal channels depending from said lower surface,
the peripheral sides of said module being defined by peripheral strip elements different from said first and second series elements, said peripheral elements having lateral outward extending projections that form a peripheral ledge around said module,
said second series elements having lateral openings therein that extend upwardly into their lower portions from said bottom edges thereof, said lateral openings defining a plurality of transverse channels in said module,
said upper portions of at least one of said first and second series elements having integral anchor portions embedded at least in part in said top porous layer, said anchor portions serving as means to fix said top porous layer to said grid member.

5. The module of claim 4 wherein said first series elements intersect said second series elements at a right angle and said vertical channels are quadrilateral in horizontal cross-section.

6. The module of claim 5 wherein said module is square in horizontal cross-section and said vertical channels are rectangular in horizontal cross-section.

7. The module of claim 6 wherein said second series elements form the short sides of said vertical channels.

8. The module of claim 4 wherein said ledge lies in the plane of said lower surface.

9. The module of claim 4 wherein said first and second series elements and said peripheral elements are molded of rigid plastic.

10. The module of claim 4 wherein said first and second series elements and said peripheral elements are integrally joined at their points of intersection with each other whereby said grid member is monolithic.

11. Apparatus for the dewatering of water and wastewater sludge which comprises;
a tank having a substantially flat bottom, an open top, and vertical sides,
exit means through which filtrate may be removed from said tank,
a plurality of the modules as defined in claim 4 positioned side by said within said tank with the bottom surfaces of said modules resting on said flat bottom of said tank, and
sealing material forming liquid-tight seals between adjacent edges of said modules.

* * * * *